Figure 1:
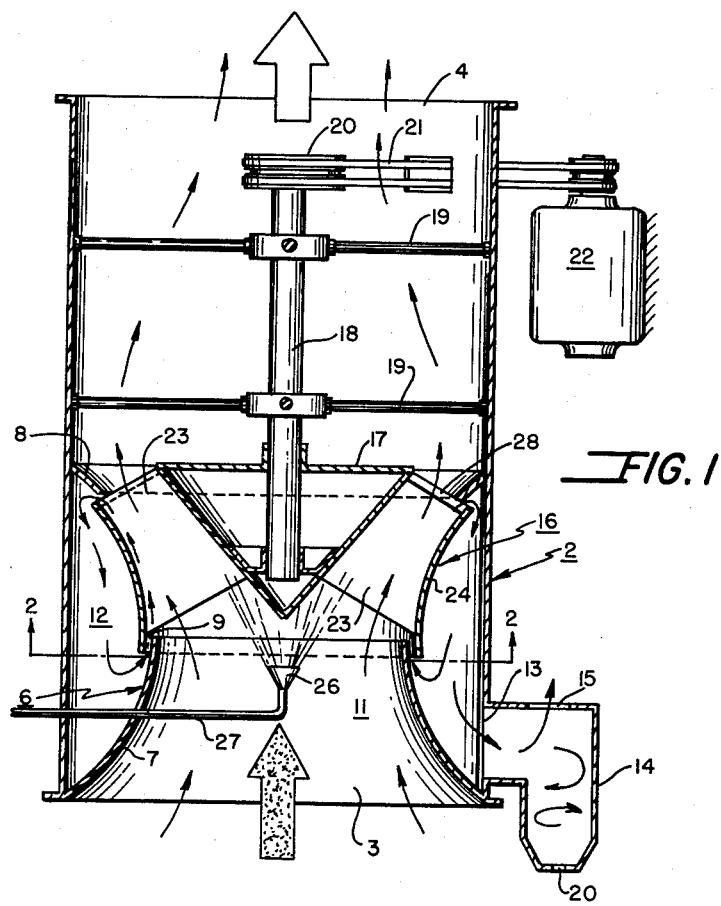

INVENTOR.
STIG SYLVAN

United States Patent Office 3,191,364
Patented June 29, 1965

3,191,364
CENTRIFUGAL DUST SEPARATOR
Stig Sylvan, Louisville, Ky., assignor to American Air Filter Company, Inc., Louisville, Ky., a corporation of Delaware
Filed May 28, 1962, Ser. No. 198,320
8 Claims. (Cl. 55—257)

The present invention relates to dust separators and more particularly to dust separators of the cyclonic type utilized for separating contaminant particles from a gaseous stream.

In accordance with the present invention, a dynamic dust separator arrangement of the continuous type is provided which is efficient in operation and is economical to construct and to maintain. In addition, the present invention provides a dust separator arrangement which occupies a minimum of space, which is comparatively light in weight, and which can be readily constructed in a variety of sizes to meet various exhaust requirements. Further, the present invention provides a dust separator arrangement which can be utilized as a wet type, requiring a minimum of liquid and affording a maximum of wetted collecting surface to the dirty gas stream to be treated.

Various other features of the present invention will become obvious to one skilled in the art upon reading the disclosure set forth hereinafter.

More particularly the present invention provides a dust separator for a dirty gas stream comprising: a housing having dirty gas inlet means and clean gas outlet means; partition means disposed within the housing to divide the housing into a primary chamber communicating with the dirty gas inlet means and the clean gas outlet means and a secondary chamber adjacent the primary chamber; the partition means having a passageway between the primary and secondary chambers; and, impeller means including a rotatable hub member disposed in the primary chamber and spaced blade members extending radially from the hub member; the blade members being radially dimensioned to extend through the passageway so that the outer portions of the upstream and downstream edges of the blade members fall within the secondary chamber to maintain a pressure gradient in the secondary chamber whereby contaminant particles from the dirty gas stream centrifuged outwardly are readily passed into the secondary chamber.

It is to be understood that various changes can be made by one skilled in the art in the arrangement, form and construction of the apparatus disclosed herein without departing from the scope or spirit of the present invention.

Figure 2:
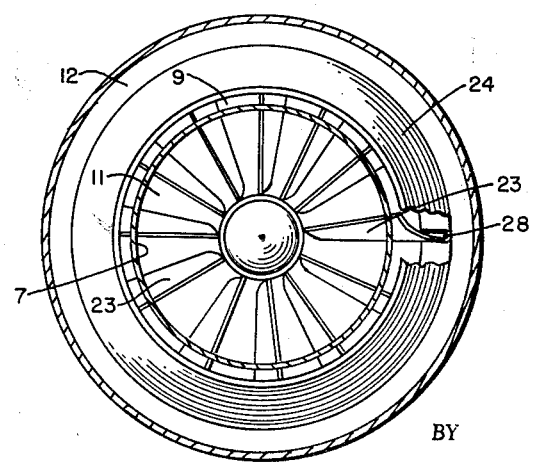

Referring to the drawing which discloses one advantageous embodiment of the present invention:

FIGURE 1 is a cross-sectional, semi-schematic plan view of the inventive apparatus; and, FIGURE 2 is a partially broken away front elevational view of the impeller of FIGURE 1 taken on line 2—2 of FIGURE 1.

As can be seen in FIGURE 1 of the drawing, there is disclosed cylindrical housing 2 having dirty gas inlet 3 and spaced, axially aligned clean gas outlet 4. Disposed within housing 2 adjacent gas inlet 3 is partition 6. Partition 6 includes upstream and downstream parts 7 and 8, respectively, which advantageously can be of hyperbolic contour. The parts 7 and 8 are spaced from each other to provide an annular passageway 9 therebetween, the two parts along with passageway 9 serving to define within housing 2 a centrally disposed primary chamber 11 and a surrounding annular secondary chamber 12. It is to be noted that secondary chamber 12 can be provided with outlet 13 which can be connected to a small conventional cyclone separator 14, outlet 13 serving as the inlet for such separator. Separator 14 can be provided with clean gas outlet 15 at the upper portion thereof and contaminant particle outlet 20 at the lower hopper portion thereof.

Disposed in primary chamber 11 along the longitudinal axis of cylindrical housing 2 for rotational movement thereabout is a semi-axial flow type impeller 16. Impeller 16 includes a conically shaped hub member 17 mounted to drive shaft 18 which is supported in housing 2 to extend along the longitudinal axis thereof by spaced bearing support members 19. The free end of shaft 18 has fixed thereto sheave arrangement 20 which, in turn, is connected to drive motor 22 through drive belts 21.

As can be seen more fully in FIGURE 2 of the drawing, extending radially from conical hub 17 are spaced blade members 23. A shroud ring 24 is fastened to the outer extremities of blade members 23, shroud ring 24 being of hyperbolic contour to conform with the hyperbolic contour of partition 6. It is to be noted that blade members 23 are radially dimensioned to extend through annular passageway 9 defined by spaced parts 7 and 8 of partition 6 so that shroud ring 24 and the outer portions of the upstream and downstream edges of blade members 23 fall within secondary chamber 12 for the reasons set forth hereinafter.

Positioned in primary chamber 11 upstream of conical hub 17 to be in facing alignment therewith is conical spray 26. Spray 26 is arranged to receive a suitable wetting liquid, such as water, from a supply source (not shown) through conduit 27 connected to the spray. It is to be noted that spray 26 is so arranged that it is capable of directing sheets of liquid therefrom substantially parallel to the side walls of conical hub 17.

As can be seen in FIGURE 2 of the drawing, the downstream edge of blades 23 are each provided with a hook 28 in the form of a channel, such channel serving to guide contaminant particles centrifuged by impeller 16 radially outward into secondary chamber 12 in a manner described hereinafter.

In a typical operation of the apparatus described, when impeller 16 is driven by motor 22 through the aforedescribed drive arrangement, the dirty gas stream to be treated is drawn through gas inlet 3 into the primary chamber 11 of cylindrical housing 2 to pass in a semi-axial direction along blades 23 of the impeller. As the dirty gas stream passes along blades 23, contaminant particles therein are centrifuged outwardly toward shroud ring 24. At the same time that the impeller is rotating, a liquid is introduced through conical spray 26 positioned upstream of impeller 16, the liquid forming a wetting surface along the surfaces of blades 23 and along the inner face of shroud ring 24 so that centrifuged contaminant particles are entrained therewith. Contaminant particles flow downstream toward the downstream edge of blades 23 where they are passed along channels 28 of the blades toward secondary chamber 12 into which the downstream edges of the blades extend. Since the gas pressure at the inlet side of an impeller is substantially less than the gas pressure at the outlet side of an impeller during rotational operation, a pressure differential is created between that portion of chamber 12 adjacent the downstream edges of blades 23 of impeller 16 and that portion of the chamber adjacent the upstream edges of blades 23 with the gas flowing in the secondary chamber 12 during rotational operation of impeller 16 from the outlet side of impeller 16 to the inlet side thereof. As a result, contaminant particles from the dirty gas stream are efficiently centrifuged into the secondary chamber 12 along with a portion of the dirty gas stream, which stream is then recirculated back to primary chamber 11 as shown in FIGURE 1. Centrifuged contaminant particles pass from chamber 12 through outlet 13 to be precipitated out by cyclonic dust separator 14. Thus, in a simple and straightforward manner, contaminant particles are efficiently removed from a dirty gas stream with an apparatus which has a minimum of operating parts, which occupies a minimum of space and which can be efficiently operated and maintained.

The invention claimed is:

1. A dust separator for a dirty gas stream comprising:
  (a) a housing having dirty gas inlet means and clean gas outlet means;
  (b) partition means disposed within said housing to divide said housing into a primary chamber communicating with said dirty gas inlet means and said clean gas outlet means and a secondary chamber adjacent said primary chamber;
  (c) said partition means having a passageway therein between said primary and said secondary chamber; and,
  (d) a semi-axial flow-type impeller means completely disposed within said housing intermediate said dirty gas outlet and said clean gas outlet thereof to serve as the sole prime mover and centrifugal separator for said dirty gas stream, said impeller means cooperating with said housing to move said dirty gas stream therethrough as it simultaneously centrifuges and separates contaminant particles therefrom, said impeller means having an inlet side and an outlet side and including a rotatable hub member disposed in said primary chamber and spaced blade members extending radially from said hub member;
  (e) said blade members being radially dimensioned to extend through said passageway so that said outer portions of the upstream and downstream edges of said blade members fall within said secondary chamber with the diameter of said outlet side of said impeller means being greater than the diameter of said inlet side so that the gas pressure at the inlet side is less than at the outlet side during rotational operation to maintain a pressure gradient in said secondary chamber with the gas flowing in said secondary chamber from said outlet side toward said inlet side whereby contaminant particles from said dirty gas stream centrifuged outwardly are readily passed into said secondary chamber.

2. The apparatus of claim 1, and liquid spray means in said dirty gas inlet means of said housing upstream of said impeller.

3. The apparatus of claim 1, and channel means on said blade members to guide contaminant particles radially outward into said secondary chamber.

4. The apparatus of claim 3, said channel means extending along the downstream edges of said blade members.

5. A dust separator for a dirty gas stream comprising:
  (a) a housing having dirty gas inlet means and clean gas outlet means;
  (b) partition means disposed within said housing to divide said housing into a primary chamber communicating with said dirty gas inlet means and said clean gas outlet means and a secondary chamber adjacent said primary chamber;
  (c) said partition means having a passageway therein between said primary and said secondary chamber; and,
  (d) a semi-axial flow-type impeller means completely disposed within said housing intermediate said dirty gas inlet and said clean gas outlet thereof to serve as the sole prime mover and centrifugal separator for said dirty gas stream, said impeller means cooperating with said housing to move said dirty gas stream therethrough as it simultaneously centrifuges and separates contaminant particles therefrom, said impeller means having an inlet side and an outlet side and including a rotatable hub member disposed in said primary chamber, spaced blade members extending radially from said hub member and a shroud ring fastened to the outer extremities of said blade members;
  (e) said blade members being radially dimensioned to extend through said passageway so that said shroud ring and outer portions of the upstream and downstream edges of said blade members fall within said secondary chamber with the diameter of said outlet side of said impeller means being greater than the diameter of said inlet side so that the gas pressure at the inlet side is less than at the outlet side during rotational operation to maintain a pressure gradient in said secondary chamber with the gas flowing in said secondary chamber from said outlet side toward said inlet side whereby contaminant particles from said dirty gas stream centrifuged to said shroud member of said impeller are readily passed into said secondary chamber.

6. A dust separator for a dirty gas stream comprising:
  (a) a cylindrical housing having spaced axially aligned dirty gas inlet means and clean gas outlet means;
  (b) partition means disposed within said housing to divide said housing into a centrally disposed primary chamber intermediate and in communication with said dirty gas inlet and clean gas outlet means of said housing and an annular secondary chamber surrounding said primary chamber;
  (c) said partition means including an annular passageway between said primary and said secondary chambers; and,
  (d) a semi-axial flow-type impeller means completely disposed within said housing intermediate said dirty gas inlet and said clean gas outlet thereof to serve as the sole prime mover and centrifugal separator for said dirty gas stream, said impeller means cooperating with said housing to move said dirty gas stream therethrough as it simultaneously centrifuges and separates contaminant particles therefrom, said impeller means having an inlet side and an outlet side and including a rotatable hub member centrally disposed in said primary chamber, spaced blade members extending radially from said hub member and a shroud ring fastened to the outer extremities of said blade members;
  (e) said blade members being radially dimensioned to extend through said passageway so that said shroud ring and outer portions of the upstream and downstream edges of said blade members fall within said secondary chamber with the diameter of said outlet side of said impeller means being greater than the diameter of said inlet side so that the gas pressure at the inlet side is less than at the outlet side during rotational operation to maintain a pressure gradient in said secondary chamber with the gas flowing in said secondary chamber from said outlet side toward said inlet side whereby contaminant particles from said dirty gas stream centrifuged to said shroud member of said impeller are readily passed into said secondary chamber.

7. A dust separator for a dirty gas stream comprising:
  (a) a cylindrical housing having a spaced axially aligned dirty gas inlet and a clean gas outlet;
  (b) a hyperbolic partition disposed within said housing to define therewith a centrally disposed primary chamber intermediate and in communication with said dirty gas inlet and clean gas outlet of said housing and an annular secondary chamber surrounding the primary chamber;
  (c) said hyperbolic partition including an annular passageway between said primary and said secondary chambers; and,
  (d) a semi-axial flow-type impeller means completely disposed within said housing intermediate said dirty gas inlet and said clean gas outlet thereof to serve as the sole prime mover and centrifugal separator for said dirty gas stream, said impeller means cooperating with said housing to move said dirty gas stream therethrough as it simultaneously centrifuges and separates contaminant particles therefrom, said semi-axial flow type impeller means having an inlet side and an outlet side and including a conically shaped hub member disposed in said primary chamber for rotational movement about the central longitudinal axis thereof, spaced blade members extending radially from said conical hub member and a hyperbolic shroud ring fastened to the outer extremities of said blade members;

(e) said blade members being radially dimensioned to extend through said connecting annular passageway with said shroud ring and outer portions of the upstream and downstream edges of said blade members falling within said secondary chamber with the diameter of said outlet side of said impeller means being greater than the diameter of said inlet side so that the gas pressure at the inlet side is less than at the outlet side during rotational operation to maintain a pressure gradient in said secondary chamber with the gas flowing in said secondary chamber from said outlet side toward said inlet side whereby contaminant particles from said dirty gas stream centrifuged to said shroud member of said impeller are readily passed into said secondary chamber.

8. The apparatus of claim 7, and conical spray means positioned in said dirty gas inlet in spaced, upstream, aligned relation to said conical hub of said impeller to initially direct a liquid spray substantially parallel the side walls thereof.

References Cited by the Examiner

UNITED STATES PATENTS

| | | | |
|---|---|---|---|
| 1,480,775 | 1/24 | Marien | 55—230 |
| 2,195,707 | 4/40 | Nutting | 55—228 |
| 2,224,617 | 10/40 | Sylvan | 55—400 |
| 2,991,927 | 7/61 | Quick | 230—119 |
| 3,059,833 | 10/62 | Benoit | 230—119 |
| 3,073,096 | 1/63 | Hayes | 55—257 |

FOREIGN PATENTS

| | | |
|---|---|---|
| 109,407 | 12/39 | Australia. |
| 514,076 | 9/52 | Belgium. |

HARRY B. THORNTON, *Primary Examiner.*

HERBERT L. MARTIN, *Examiner.*